Nov. 10, 1925
P. M. KUEHN
GASEOUS LIQUID CONTACT APPARATUS
Filed Jan. 10, 1924  3 Sheets-Sheet 2
1,561,000
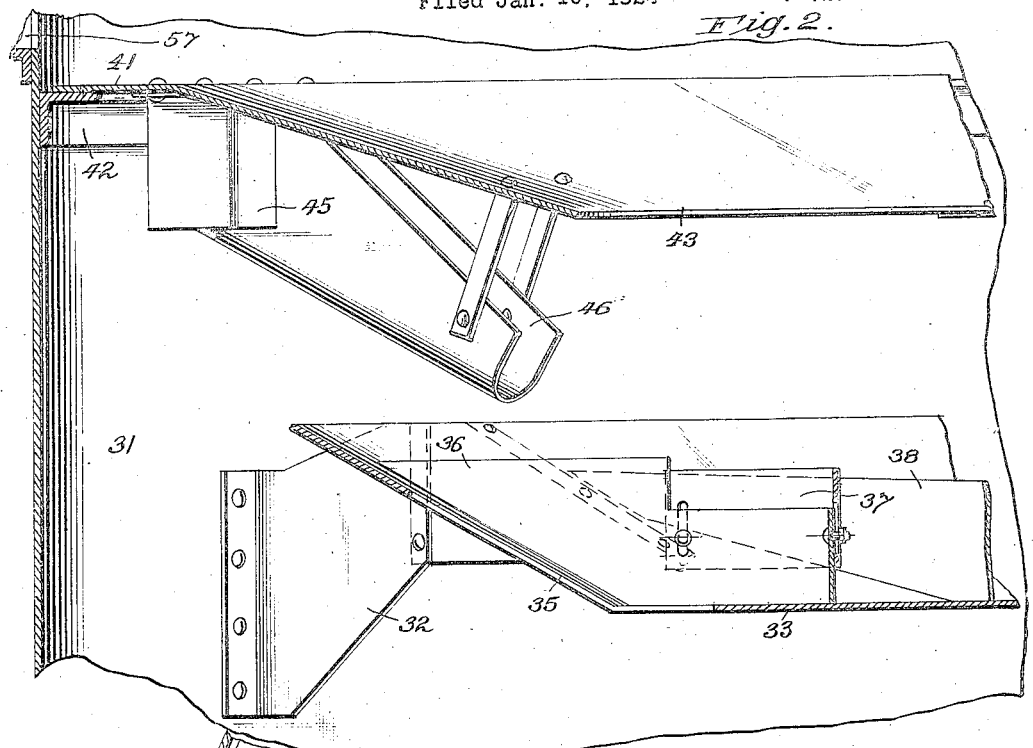
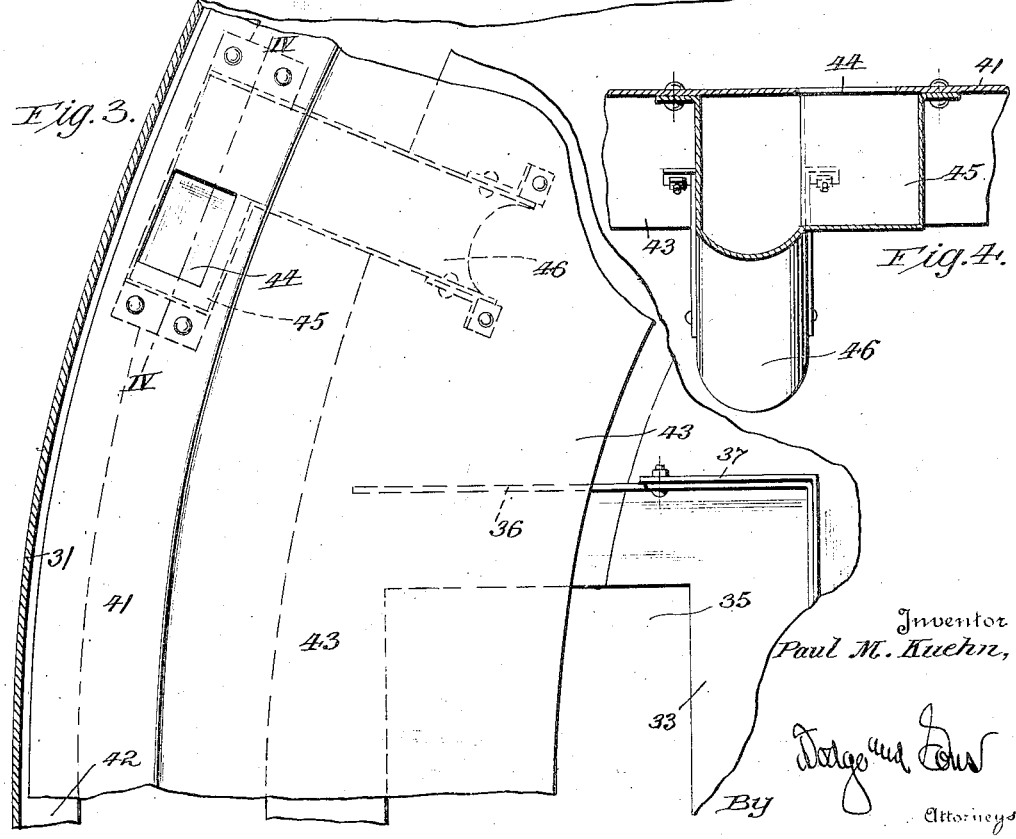
Inventor
Paul M. Kuehn,
By Dodge and Sons
Attorneys.

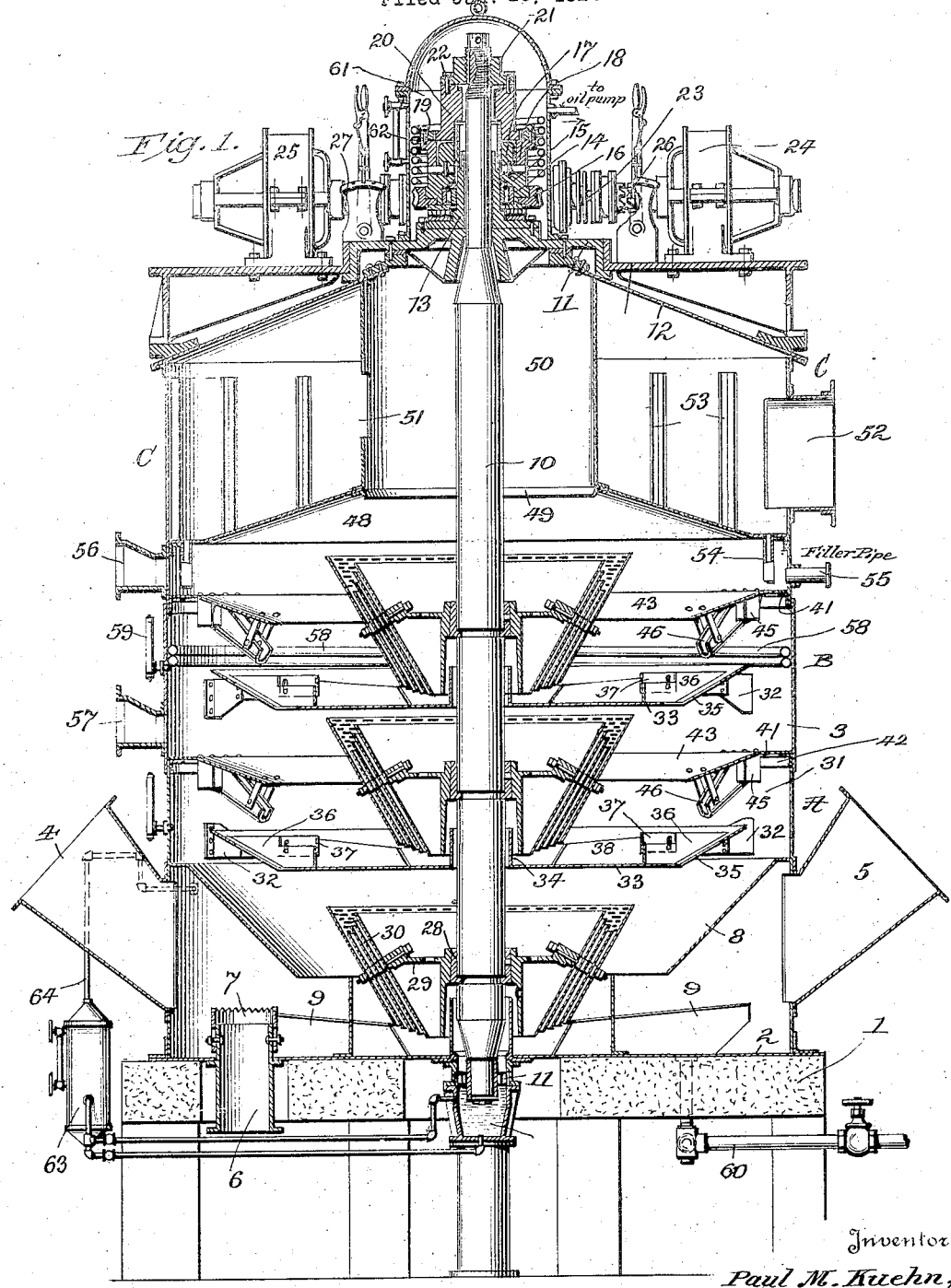

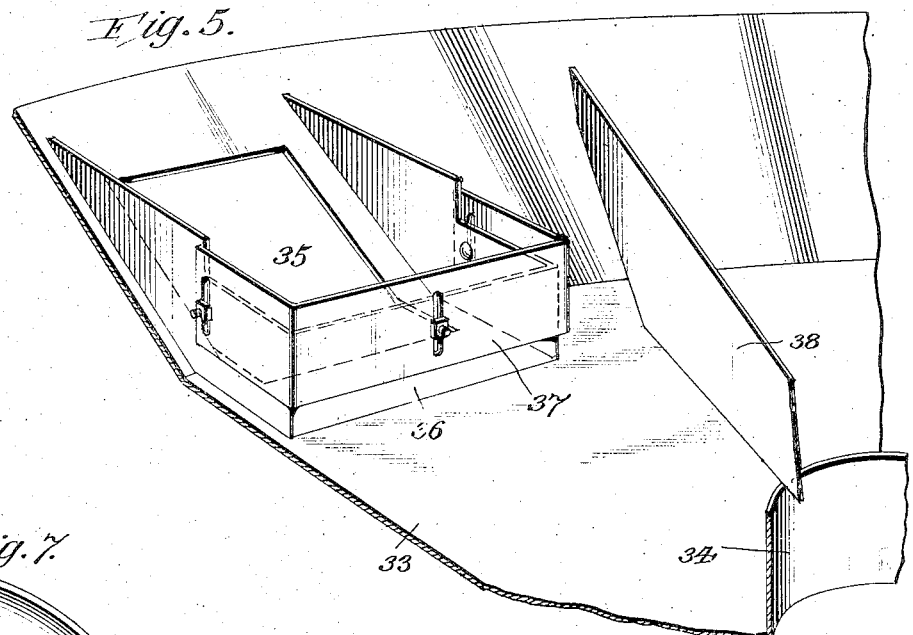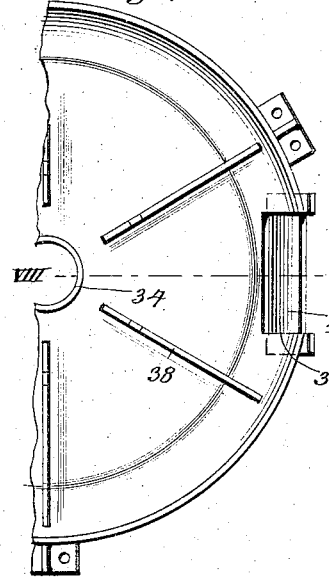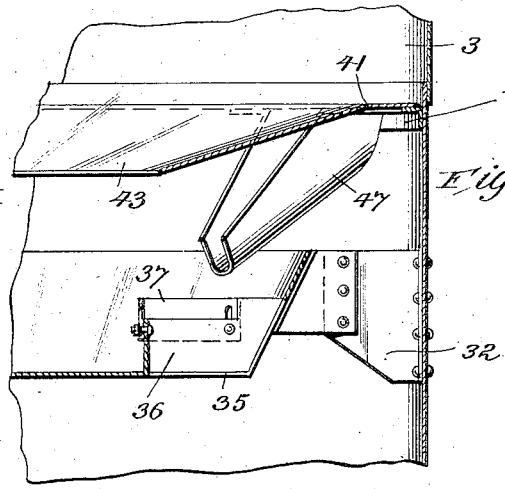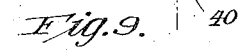

Patented Nov. 10, 1925.

1,561,000

UNITED STATES PATENT OFFICE.

PAUL M. KUEHN, OF BALTIMORE, MARYLAND, ASSIGNOR TO THE BARTLETT HAYWARD COMPANY, OF BALTIMORE, MARYLAND, A CORPORATION OF MARYLAND.

GASEOUS-LIQUID CONTACT APPARATUS.

Application filed January 10, 1924. Serial No. 685,391.

*To all whom it may concern:*

Be it known that PAUL M. KUEHN, a citizen of the United States, residing at Baltimore, in the State of Maryland, have invented certain new and useful Gaseous-Liquid Contact Apparatus, of which the following is a specification.

This invention pertains to gaseous and liquid contact apparatus and has for its main object the production of a machine wherein the degree of contact between the atomized or sprayed liquid and the gas or gases may be regulated as desired. The invention has for its further object the provision of special means employed to return the sprayed liquid back to the pan from which latter the spraying mechanism removes it and throws it outwardly into and through the gas which is passed through the apparatus. A further object of the invention is to provide special means whereby the depth of the liquid in the pan may be regulated and a variation of the amount of liquid withdrawn from the pan and a consequent variation in the spray effected. Still another object is to provide means for removing the entrained liquid from the gas prior to the passage of the gas from the apparatus.

With these and other objects and advantages in view as will hereinafter appear, reference is had to the annexed drawings wherein:

Fig. 1 is a vertical sectional elevation showing one embodiment of the invention, Fig. 2 an enlarged sectional elevation showing a portion of one of the pans and its adjustable weir, one of the underlying baffle plates and one of the return spouts, Fig. 3 a top plan view thereof, Fig. 4 a detailed sectional elevation taken on the line IV—IV of Fig. 3, Fig. 5 a perspective view of a portion of one of the pans showing in detail one of the adjustable weirs or dams for regulating the depth of liquid in the pan, Fig. 6 a vertical sectional view showing the modified form of discharge spout, Fig. 7 a top plan view showing a modified form of weir, Fig. 8 a transverse vertical sectional view taken on the line VIII—VIII of Figs. 7 and 9, and Fig. 9 a side elevation showing the weir.

Referring first to Figs. 1 to 5 inclusive, it will be seen that the apparatus is composed or built up of a series of superimposed sections mounted upon a suitable base into and through which latter the gas is introduced, a top moisture entraining section through which the gas finally passes to the point of discharge, a vertically disposed shaft common to all of the sections and means carried by the shaft and rotatable therewith for spraying the liquid. Said means in the instant case extend down into pans in which the liquid is present and from which it is withdrawn and sprayed outwardly against the walls of the sections, deflectors, which overlie the margin of the pans, serving to return the sprayed liquid to the underlying pans. Said pans and deflectors produce a tortuous passage in the apparatus which the gas is forced to take in traveling from the lower portion of the apparatus to the upper discharge end thereof, whereby an intimate contact is had between the liquid and gas.

In the drawings 1 denotes a suitable foundation upon which is mounted the base section of the structure, said section comprising a bottom 2 and an upstanding annular wall 3 through which latter extend the gas inlets 4 and 5.

This bottom or base section may be termed a basin or pan, and is provided with an overflow pipe 6, preferably having an adjustable collar 7 so that the level of the liquid in the pan may be varied as desired.

Extending downwardly into lower basin from the upper portion thereof is an inverted frusto-conical deflector or baffle 8 which acts to deflect the incoming gas downwardly and into contact with the liquid which is within the basin.

Located upon the bottom of the basin is a series of fixed vanes 9 which are preferably radially arranged and act to prevent the liquid from swirling around within the basin under the action of the liquid elevating and spraying devices or mechanism hereinafter described.

Superimposed upon the bottom section or basin is a series of sections denoted in the present instance by A and B and an upper hood or gas off-take denoted generally by C.

While I have shown but two sections, it is to be understood that any number may be employed, the number varying according to the particular material undergoing treatment.

Extending upwardly through the various sections is a vertically disposed shaft 10, the lower end whereof is mounted in a bearing of suitable form, the bearing being such that the shaft may be adjusted vertically, for a purpose which will presently appear, and likewise will allow the shaft to properly center itself.

The shaft at its upper portion is slightly reduced in diameter and its upper end is threaded. Any suitable form of supporting bearing for the shaft may be employed which will permit of longitudinal adjustment of the shaft and a rapid rotation thereof, the bearing may be of a rocking or tilting type so that the shaft may automatically center itself. In the instant case the shaft passes upwardly through a supporting plate 11 secured to the roof or top 12 of the gas off-take section C. A quill or sleeve 13 is secured to the plate, said sleeve surrounding the shaft throughout a portion of its reduced portion. Suitable anti-friction members as 14 are interposed between said element and a collar 15 to which is secured a worm gear 16. A rocking bearing, comprising the elements 17 and 18, is interconnected with the collar 15, element 18 at its upper end being provided with an internally toothed ring 19. A sleeve 20 is secured to the upper end of the shaft by suitable splines which admit of vertical adjustment of the shaft with reference to the sleeve, the sleeve at its lower portion being provided with gear teeth which engage those of the ring 19. A nut 21 is screwed upon the upper threaded end of the shaft and when the shaft is brought to the desired position, said nut will be secured as by machine bolts 22 passing into sleeve 20.

The above described construction provides a self-centering anti-friction suspension for the shaft. The arrangement just described also permits the shaft to be raised or lowered and to thereby vary the extent of dip of the spraying elements into the liquid in the various basins or pans throughout the apparatus, with a consequent variation in the amount and character of the spray.

A worm shaft not shown, meshes with gear 16, the worm being secured to a shaft 23 which latter is designed to be driven by one or another of two electric motors 24 and 25 or by any type of steam, gas or oil driven power units which may be connected to the shaft through suitable clutches 26 and 27. One or the other motor will be utilized and in case one fails, the other may be thrown in to insure constant operation of the machine to complete any desired run.

Secured to the lower portion of shaft 10 in the lower basin or chamber is a hub 28 carrying a spider frame 29 to which latter is secured a series of inverted frusto-conical members designated as a whole by 30, the outermost member extending upwardly beyond the others and being perforated throughout its upper portion. This arrangement is similar to that set forth and claimed in Letters Patent to Feld No. 983,037, and serves when rotated, to elevate or pump the liquid from the pan and to throw it out laterally in a finely divided or misty condition into and through the upgoing gas which is forced in under pressure through the openings 4 and 5. The liquid strikes the deflector or baffle 8, drains down along the surface thereof in counter flow to the gas and passes from the lower edge of the deflector directly across the path of the incoming, upwardly flowing gas. Such liquid is again picked up by the cone elements and thus a constant recirculation of the liquid within the bowl or basin is maintained.

The sections A and B are alike in form as are the other sections where a greater number is employed, hence a description of one will suffice for all.

The body 31 is circular in form and is provided with a series of inwardly extending brackets 32 which form the support for a pan 33, the upper edge or rim whereof stands in spaced relation to the body wall. The pan is provided with an upwardly extending hub or annular flange 34, which projects upwardly into the lower downwardly extending skirt of the impeller hub, such parts with the liquid in the pan forming a seal which precludes the flow of gas upwardly about the shaft. To regulate and maintain the level of the liquid in the pan at any desired level, there is provided an adjustable weir or dam (one or more) best shown in Figs. 2, 3 and 5.

An opening 35 is formed in the inclined side wall of the pan and an upstanding curb 36 is formed around the same, said curb being lowered or cut away at its inner portion. A dam or weir plate 37 is adjustably secured to the curb and by raising or lowering the same the liquid level in the pan may be controlled and maintained. Radially disposed surge-preventing plates 38 are secured within the pan. The regulation of the depth of the liquid may also be controlled in the manner shown in Figs. 8 and 9, wherein the upper edge of the pan is shown as cut away as at 39 and an adjustable gate 40 is secured to the outer face of the pan. By raising or lowering the gate, the overflow, and consequently the level of the liquid, is determined and fixed Located above the pan or basin is a deflector or baffle comprising an annular flat section 41 which abuts the wall of the chamber and is secured thereto in any suitable manner as by an angle iron 42 and a downwardly inclined frusto-conical member 43. The last named member stands above or in spaced relation to the underlying pan and extends inwardly over the same to a considerable extent, see Figs. 1, 2, and 3, thereby producing a marked circuitous passage for the gas as it passes upwardly through the apparatus and causing a long and intimate contact between the liquid and gas.

As will be seen upon reference to Fig. 1, the liquid which is drawn upwardly from the pan is thrown outwardly in a sprayed or atomized condition above the deflector and as a consequence the liquid flows down over the deflector back to the pan.

I have found that owing to the swirling action which is set up on the deflectors by reason of the manner in which the liquid is thrown thereon, that it is advisable to provide means for breaking up such action and likewise to insure a return of a portion of the liquid at least directly to the pan. To this end the deflector, and preferably the flat section thereof, is provided with a series of openings as 44 beneath each of which there is secured an oblong sump or receptacle 45 into which the liquid passes and from which, in turn, it is discharged to the pan by a trough or gutter 46. Said trough opens into the sump at a point remote from the opening 44, and the lower end thereof lies above the pan and discharges into the same.

Aside from the advantages above set forth, the direct return of a portion of the liquid to the pan has the further advantage of reducing the volume of liquid which flows downwardly and over the edge of the deflector, the result being that such reduced volume of liquid may be readily broken up and become thoroughly commingled with the oncoming gas. Furthermore, a return of a portion of the bulk of the liquid directly to the pan always insures the presence in the pan of a volume sufficient for the elevating cones to act upon.

It is, of course, not essential that a receptacle or sump as 45 be employed but it is preferred as it allows the liquid for a short interval to continue in the same course of travel as that which obtains upon the deflector and prevents the same from piling or damming up.

In Fig. 6 there is shown a spout or gutter 47 leading directly from the opening in the deflector.

Located above the uppermost section is a dome-shaped cover 48 provided with a relatively large centrally disposed opening about which is arranged a downwardly extending collar 49. The opening is in communication with a hood or casing 50 which is closed off at its upper end and provided with a lateral opening 51 which affords communication with the chamber or section C. Said opening 51 is preferably located diametrically opposite the off-take opening 52 for the gas in order that the gas will be caused to travel around within the chamber C and come into contact with the various upright vanes or intercepters 53 secured to the inner face of the wall of the chamber whereby any entrained liquid will be arrested and run down, finding its way back to the section below through drain pipes as 54.

The liquid to be treated, or which is to be utilized in the treatment of the gaseous medium, is introduced into the upper section through a pipe 55, though if desired, it will be readily understood that the liquid, or liquids, having different characteristics may be introduced into the different sections. So, too, gases may be introduced directly into the various chambers or sections through inlets as 56 and 57.

Heating or cooling elements, such for instance as coils 58, may be utilized to modify or change the temperature in the sections, the temperature being indicated by thermometers 59.

A drain pipe 60 extends through the base.

To insure proper lubrication and prevent the escape of gases, the upper bearing is provided with a housing 61 which is kept filled with oil, the oil being kept cool by a coil 62.

The lower bearing 11 also runs in oil supplied from a reservoir 63, the pressure wherein is equalized through a pipe 64 extending into the base section of the apparatus.

The apparatus is susceptible of a wide variety of uses where an intimate contact between liquids and gases is essential or desirable; it is not thought necessary to outline them here as they are well known to those skilled in the arts.

It is thought that the operation of the apparatus, or scrubber as it is commonly denominated, will be understood from the foregoing description, hence a résumé thereof is omitted. Suffice to say that the liquid is thoroughly broken up or atomized and is recirculated a number of times in each section before passing to the section below. Moreover, the gas is brought into intimate contact with the atomized liquid so as to induce the desired interaction therebetween. As above noted, by adjusting the extent of dip of the liquid elevating and atomizing elements, and likewise regulating the depth of liquid in the pans, a wide variation in the spraying action may be had. So, too, the speed of rotation of shaft 10, and its associated elements, has a marked effect on the volume of liquid which is elevated and sprayed.

In so far as the broader aspects of the invention are concerned other liquid elevating and spraying elements than those shown and described may be utilized.

The base and the various superimposed sections form in effect a shell or casing and inasmuch as the various sections are alike in form the structure may be built up to any capacity desired by merely adding sections.

No claim is made herein to the specific form of shaft supporting and driving mechanism, or more specifically, to the manner in which the shaft is mounted and sustained, as the same forms the subject-matter of my co-pending application, Serial No. 616,512, filed February 2, 1923.

Having thus described my invention, what I claim is:—

1. In an apparatus of the character specified, the combination of a suitable casing; a pan-like receptacle mounted therein with its edge in spaced relation to the casing; a baffle extending inwardly from the wall of the casing above and in spaced relation to the pan; means for withdrawing liquid from the pan and throwing it outwardly above the baffle; means for returning a portion of the liquid so thrown directly to the pan without traveling over the baffle; and means for introducing a gas into the casing.

2. In an apparatus of the character specified, the combination of a suitable casing; a pan-like receptacle mounted therein; a baffle extending inwardly from the wall of the casing above and in spaced relation to the pan; means for withdrawing liquid from the pan and throwing it outwardly above the baffle; means associated with the baffle for directly returning a portion of the liquid directly to the pan other than by a reflow of such portion over the baffle; and means for introducing a gas into the casing.

3. In an apparatus of the character specified, the combination of a casing; a pan-like receptacle mounted therein; a baffle extending inwardly from the wall of the casing above and in spaced relation to the pan, said baffle having a portion, at least, inclining downwardly toward the pan; means for withdrawing liquid from the pan and throwing the same outwardly by centrifugal action above the baffle; means serving to break up the swirling motion of the liquid upon the baffle set up by such centrifugal action; and means for introducing gas into the casing.

4. In an apparatus of the character specified, the combination of a casing; a pan-like receptacle mounted therein; a baffle extending inwardly from the wall of the casing above and in spaced relation of the pan, said baffle having a portion, at least, inclining downwardly toward the pan; means for withdrawing liquid from the pan and throwing the same outwardly by centrifugal action above the baffle; means serving to break up the swirling motion of the liquid upon the baffle set up by such centrifugal action and to return a portion of the liquid directly to the pan without flowing down over the baffle; and means for introducing gas into the casing.

5. In an apparatus of the character specified, the combination of a casing; a pan-like receptacle mounted therein; a baffle extending inwardly from the wall of the casing above and in spaced relation to the pan; said baffle having an annular substantially flat portion adjacent the wall with at least one opening therein; a spout in communication with said opening, said spout terminating over the pan; and means for withdrawing liquid from the pan and spraying it outwardly above the baffle.

6. In an apparatus of the character specified, the combination of a casing; a pan-like receptacle mounted therein; a baffle extending inwardly from the wall of the casing above and in spaced relation to the pan, said baffle having an annular flat portion having at least one opening formed therein; a sump located below said opening; a spout extending from the sump and discharging into the pan; and means for withdrawing liquid from the pan and spraying the same outwardly above the baffle.

7. In an apparatus of the caracter specified, the combination of a casing; a pan-like receptacle mounted therein adapted to contain a liquid to be sprayed; means for varying the depth of liquid in the pan; means for withdrawing liquid from the pan and spraying it outwardly in the casing; and means for returning the liquid thus sprayed back to the pan.

8. In an apparatus of the character specified, the combination of a casing; a pan-like receptacle mounted therein adapted to contain a liquid to be sprayed; an adjustable weir carried by the pan, whereby the liquid level in the pan may be determined and regulated; means for withdrawing the liquid from the pan and spraying it outwardly into the casing; and means for returning the sprayed liquid to the pan.

9. In an apparatus of the character specified, the combination of a casing; a pan-like receptacle mounted therein adapted to contain a liquid to be sprayed; means for regulating the depth of liquid in the pan; means dipping into the liquid, said means serving to withdraw the liquid and to spray it outwardly into the casing; and means for regulating the depth of immerson of said last-named means.

10. In an apparatus of the character specified, the combination of a casing; a pan-like receptacle mounted therein and provided with means for maintaining liquid therein at a predetermined level; a shaft; a series of frusto-conical members secured thereto, the lower ends dipping into the liquid; means for rotating the shaft; and means for adjusting the shaft longitudinally.

11. In an apparatus of the character specified, the combination of a casing; a pan-like receptacle mounted therein; means associated with the pan to regulate the effective liquid retaining depth thereof; a shaft; a series of frusto-conical members secured to the shaft, the lower ends whereof dip into a liquid placed in the pan; means for rotating the shaft; means for adjusting the shaft longitudinally; and means for returning the liquid sprayed outwardly by the frusto-conical members to the pan.

12. In an apparatus of the character specified, the combination of a casing; a pan-like receptacle mounted therein and provided with means to regulate the effective liquid retaining depth thereof, said pan being spaced at its edge away from the casing; a baffle extending inwardly from the casing above the pan, and in spaced relation thereto; means for withdrawing the liquid from the pan and spraying it outwardly above the baffle; and means for returning a portion of the sprayed liquid directly to the pan other than by reflow over the baffle.

13. In an apparatus of the character specified, the combination of a casing; a pan-like receptacle mounted therein and provided with means to regulate the effective liquid retaining depth thereof, said pan being spaced at its edge away from the casing; a baffle extending inwardly from the casing above the pan, and in spaced relation thereto; a vertically disposed shaft; means for rotating the shaft; means for varying the longitudinal position of said shaft; means carried by the shaft and dipping into a liquid contained in the pan, said means serving to withdraw the liquid and spray the same outwardly above the baffle; and means for returning a portion of the sprayed liquid directly to the pan other than by reflow over the baffle.

14. In an apparatus of the character specified, the combination of a casing; a pan-like receptacle mounted therein and provided with means to regulate the effective liquid retaining depth thereof, said pan being spaced at its edge away from the casing; a baffle extending inwardly from the casing above the pan, and in spaced relation thereto; a vertically disposed shaft; means for rotating the shaft; means for varying the longitudinal position of said shaft; means carried by the shaft and dipping into a liquid contained in the pan, said means serving to withdraw the liquid and spray the same outwardly above the baffle; and a series of spouts communicating with openings formed in the outer portion of the baffle for returning a portion of the sprayed liquid directly to the pan.

15. In an apparatus of the character specified, the combination of a casing; means located therein for atomizing a liquid; means for introducing gas into said casing, said casing having an outlet opening at its upper end; a chamber located above said opening; a hood located within the chamber and in communication with the opening aforesaid, said hood being provided with a lateral opening; and means located within said chamber for removing entrained particles of liquid from the gas which passes therethrough.

16. In an apparatus of the character specified, the combination of a casing; means located therein for atomizing a liquid; means for introducing gas into said casing, said casing having an outlet opening at its upper end; a chamber located above said opening; a hood located within the chamber and in communication with the opening aforesaid, said hood being provided with a lateral opening; and a series of baffles located upon the wall of said chamber adapted to remove the entrained liquid particles from the gas as it passes through the chamber.

17. In an apparatus of the character specified, the combination of a casing; a pan-like receptacle mounted therein adapted to contain a liquid to be sprayed; means for varying the depth of liquid in the pan; a series of inverted frusto-conical members, the lower ends whereof extend into the liquid; means for rotating said members; and means for returning the liquid sprayed outwardly by said members back to the pan.

18. In an apparatus of the character specified, the combination of a casing; a pan-like receptacle mounted therein adapted to contain a liquid to be sprayed; an adjustable weir carried by the pan, whereby the liquid level in the pan may be determined and regulated; a series of inverted frusto-conical members, the lower ends whereof dip into the liquid; means for rotating said members; and means for returning the liquid sprayed outwardly by said members to the pan.

19. In an apparatus of the character specified, the combination of a casing; a pan-like receptacle mounted therein adapted to contain a liquid to be sprayed; means for regulating the depth of liquid in the pan; a series of inverted frusto-conical members, the lower ends whereof dip into the liquid; means for rotating said frusto-conical members; means for returning the liquid sprayed outwardly by said members back to the pan; and means associated with the pan to prevent surging or rotative movement of the liquid in the pan owing to the rotation of the frusto-conical members.

20. In an apparatus of the character specified, the combination of a casing; a pan-like receptacle mounted therein adapted to contain a liquid to be sprayed; means for varying the depth of liquid in the pan; a series of inverted frusto-conical members, the lower ends whereof dip into the liquid in the pan; means for rotating said members; and means located within the pan to prevent surging motion of the liquid within the pan owing to the rotative action of the frusto-conical members.

21. In an apparatus of the character specified, the combination of a casing; a pan-like receptacle mounted therein adapted to contain a liquid to be sprayed; means for varying the depth of liquid in the pan; a series of inverted frusto-conical members, the lower ends whereof extend into the liquid; means for rotating said members; and means for returning the liquid sprayed outwardly by said members, toward the center of the casing.

22. In an apparatus of the character specified, the combination of a casing; a pan-like receptacle mounted therein adapted to contain a liquid to be sprayed; means for varying the depth of liquid in the pan; means for withdrawing liquid from the pan and spraying it outwardly in the casing; and means for returning said sprayed liquid toward the center of the casing.

In testimony whereof I have signed my name to this specification.

PAUL M. KUEHN.